US008712311B2

(12) United States Patent  (10) Patent No.: US 8,712,311 B2
Mitamura  (45) Date of Patent: Apr. 29, 2014

(54) IMAGE READING APPARATUS AND IMAGE FORMING APPARATUS

(75) Inventor: Akiyuki Mitamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1041 days.

(21) Appl. No.: 12/131,361

(22) Filed: Jun. 2, 2008

(65) Prior Publication Data

US 2009/0003907 A1  Jan. 1, 2009

(30) Foreign Application Priority Data

Jun. 14, 2007 (JP) ................................ 2007-157954

(51) Int. Cl.
*G03G 15/00* (2006.01)
*G03G 15/04* (2006.01)
*H04N 1/00* (2006.01)

(52) U.S. Cl.
USPC .......................................................... 399/380

(58) Field of Classification Search
USPC .......................................................... 399/380
See application file for complete search history.

(56) References Cited

U.S. PATENT DOCUMENTS

| | | | | |
|---|---|---|---|---|
| 4,159,778 | A * | 7/1979 | Pueschner et al. | 414/460 |
| 4,940,433 | A * | 7/1990 | Raber | 440/1 |
| 5,035,414 | A | 7/1991 | Shibanaka et al. | |
| 7,325,936 | B2 | 2/2008 | Sakamoto et al. | |
| 7,512,376 | B2 * | 3/2009 | Suzuki | 399/380 |
| 7,635,041 | B2 | 12/2009 | Adachi | |
| 2006/0262432 | A1 | 11/2006 | Sakamoto et al. | |
| 2008/0173493 | A1 * | 7/2008 | Adachi | 180/218 |

FOREIGN PATENT DOCUMENTS

| | | | | | |
|---|---|---|---|---|---|
| JP | 56107269 | A * | 8/1981 | ............. | G03G 15/04 |
| JP | 57046269 | A * | 3/1982 | ............. | G03G 15/04 |
| JP | 02-147542 | A | 6/1990 | | |
| JP | 4-085528 | A | 3/1992 | | |
| JP | 04085528 | A * | 3/1992 | ............. | G03G 15/04 |
| JP | 07271115 | A * | 10/1995 | ............. | G03G 15/00 |
| JP | 09118492 | A * | 5/1997 | ............. | B66C 13/08 |
| JP | 2003005309 | A * | 1/2003 | ............. | G03G 15/00 |
| JP | 2003162016 | A * | 6/2003 | ............. | G03G 15/00 |
| JP | 2004020804 | A * | 1/2004 | ............. | G03G 15/00 |
| JP | 2005325523 | A * | 11/2005 | ............. | G03G 15/00 |
| JP | 2006-50225 | | 2/2006 | | |

(Continued)

OTHER PUBLICATIONS

Machine translation of JP 2006050225 A, JPO, Aug. 15, 2011.*

(Continued)

*Primary Examiner* — Nguyen Ha
(74) *Attorney, Agent, or Firm* — Fitzpatrick, Cella, Harper & Scinto

(57) ABSTRACT

In an image reading apparatus which uses plural motors to open and close an original conveying apparatus, the original conveying apparatus can smoothly be opened and closed. The image reading apparatus includes an original base plate on which an original is placed; an original conveying apparatus which can be opened and closed with respect to the original base plate, the original conveying apparatus pressing the original against the original base plate while closed; a reading portion which reads an image of the original pressed against the original base plate by the original pressing portion; plural motors which open and close the original conveying apparatus; plural rotary encoders which detect actuation states of the motors; and an opening and closing action controlling portion which controls the motors to match actuation speeds of the plural motors with each other based on the actuation states detected by the rotary encoders.

10 Claims, 11 Drawing Sheets

(56) References Cited

FOREIGN PATENT DOCUMENTS

| JP | 2006050225 A | * | 2/2006 | ............... H04N 1/00 |
| JP | 2006078966 A | * | 3/2006 | ............. G03G 15/00 |
| JP | 2006-321265 A | | 11/2006 | |
| WO | 2007-013282 A1 | | 2/2007 | |

OTHER PUBLICATIONS

Office Action—Japanese Patent Application No. 2007-157954, Japanese Patent Office, dated May 15, 2012.

* cited by examiner

IMAGE READING APPARATUS AND IMAGE FORMING APPARATUS

BACKGROUND OF THE INVENTION

1. Field of the Invention

The present invention relates to an image reading apparatus which reads an image of an original and an image forming apparatus provided with the image reading apparatus.

2. Description of the Related Art

Conventionally, the image forming apparatus includes the image reading apparatus in an upper portion of a main body thereof, and the original is copied on a sheet based on information on the original image read by the image reading apparatus, thereby discharging the sheet to the outside to provide the copy of the original to a user.

The image reading apparatus includes an original base plate, an original pressing portion, and an image reading portion. The original is placed on the original base plate. The original pressing portion can be opened and closed with respect to the original base plate, and the original pressing portion presses the original against an original base plate while closed. The image reading portion reads an image of the original which is pressed against the original base plate by the original pressing portion. In such cases, the original pressing portion includes an original conveying apparatus which automatically feeds the original to the original base plate and pressing plate (hereinafter referred to as "original conveying apparatus").

In some pieces of image reading apparatus, when a user places the original on the original base plate, the original conveying apparatus or pressing plate is opened and closed by one motor (for example, see Japanese patent Application Laid-Open No. 2006-50225).

However, in the conventional image reading apparatus, a large motor having a large driving force is required because the original conveying apparatus is opened and closed by the one motor. Sometimes the use of the large motor locally needs a wide installation space to restrict the installation space of the motor.

Therefore, it has been thought that the original conveying apparatus is opened and closed by plural small motors.

In the original conveying apparatus of the image reading apparatus in which the plural motors are used, when a variation in rotation angular velocity between the motors is generated, the original conveying apparatus is inclined about a front-back direction axis (for example, the letter L1 of FIG. 3) or vibration is generated in the original conveying apparatus. Particularly, the phenomenon such as the inclination and the vibration emerges significantly in the case of an uneven weight distribution of the original conveying apparatus.

Accordingly, in the image reading apparatus in which the plural motors are used, the original conveying apparatus cannot smoothly be opened and closed, or a noise is generated. Additionally, the original is pressed against the original base plate while the original conveying apparatus is inclined, thereby shifting a position of the original.

In the image forming apparatus including the image reading apparatus in which the original position is shifted, when the image of the original is copied on the sheet, because the position of the copied image is shifted, it is necessary to perform the read of the original with the image reading apparatus and the copy of the image on the sheet again.

SUMMARY OF THE INVENTION

The present invention provides an image reading apparatus which can smoothly open and close the original pressing portion in the image reading apparatus which uses plural driving portions to open and close the original pressing portion.

The present invention provides an image forming apparatus including an image reading apparatus which can read the original without shifting the original position to decrease the number of cases where the image is re-formed on the new sheet.

In accordance with an aspect of the invention, an image reading apparatus includes an original base plate on which an original is placed; an original pressing portion which can be opened and closed with respect to the original base plate, the original pressing portion pressing the original against the original base plate while the original base plate is closed; an image reading portion which reads an image of the original, the original being pressed against the original base plate by the original pressing portion; plural driving portions which open and close the original pressing portion; plural actuation state detection portions which detect actuation states of the driving portions; and a controlling portion which controls the driving portion to match actuation speeds of the plural driving portions to each other based on the actuation states detected by the actuation state detection portions.

Accordingly, in the image reading apparatus of the invention, the controlling portion performs the control such that the actuation speeds of the plural driving portions are matched with each other, so that the inclination of the original pressing portion can be decreased to smoothly open and close the original pressing portion. Additionally, the vibration can be decreased to reduce the noise. Additionally, the original position is hardly shifted when the original pressing portion presses the original against the original base plate.

Accordingly, the image forming apparatus of the invention includes the image reading apparatus in which the original position is hardly shifted when the original pressing portion presses the original against the original base plate, so that the number of cases where the image is re-formed on the new sheet can be decreased to improve the image forming efficiency.

Further features of the present invention will become apparent from the following description of exemplary embodiments (with reference to the attached drawings).

DESCRIPTION OF THE EMBODIMENTS

An image reading apparatus according to an exemplary embodiment of the invention and an image forming apparatus provided with the image reading apparatus will be described below with reference to the drawings.

(Image Forming Apparatus)

Figure 1A:
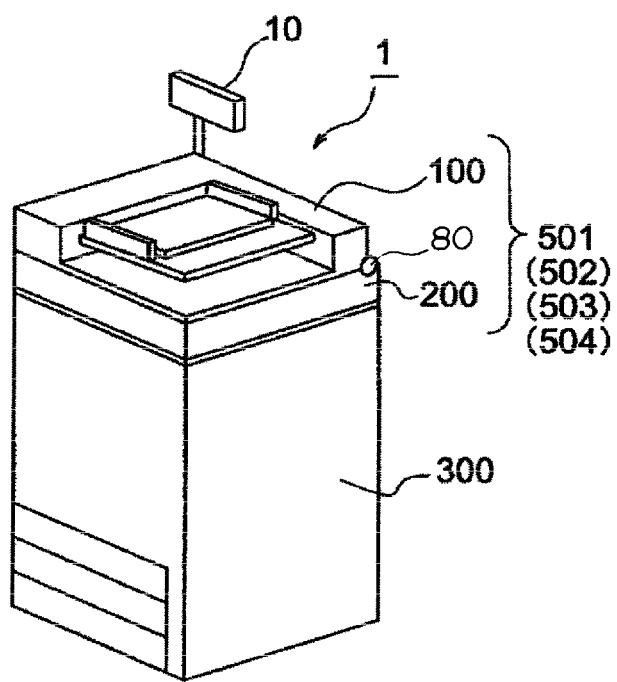
FIG. 1A illustrates a perspective view of an appearance of an image forming apparatus according to an embodiment of the invention.
Figure 1B:
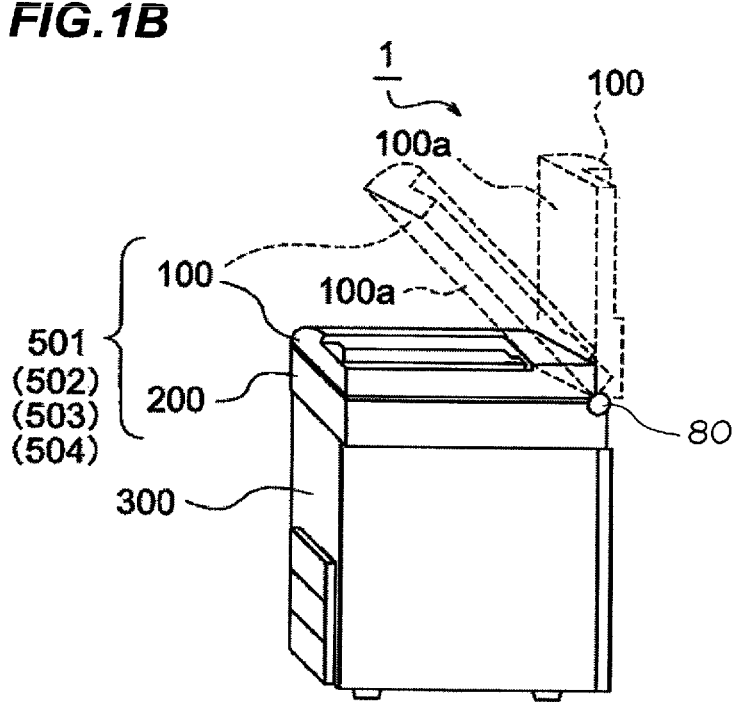
FIG. 1B illustrates a development of an original conveying apparatus in an image forming apparatus according to an embodiment of the invention.
Figure 2:
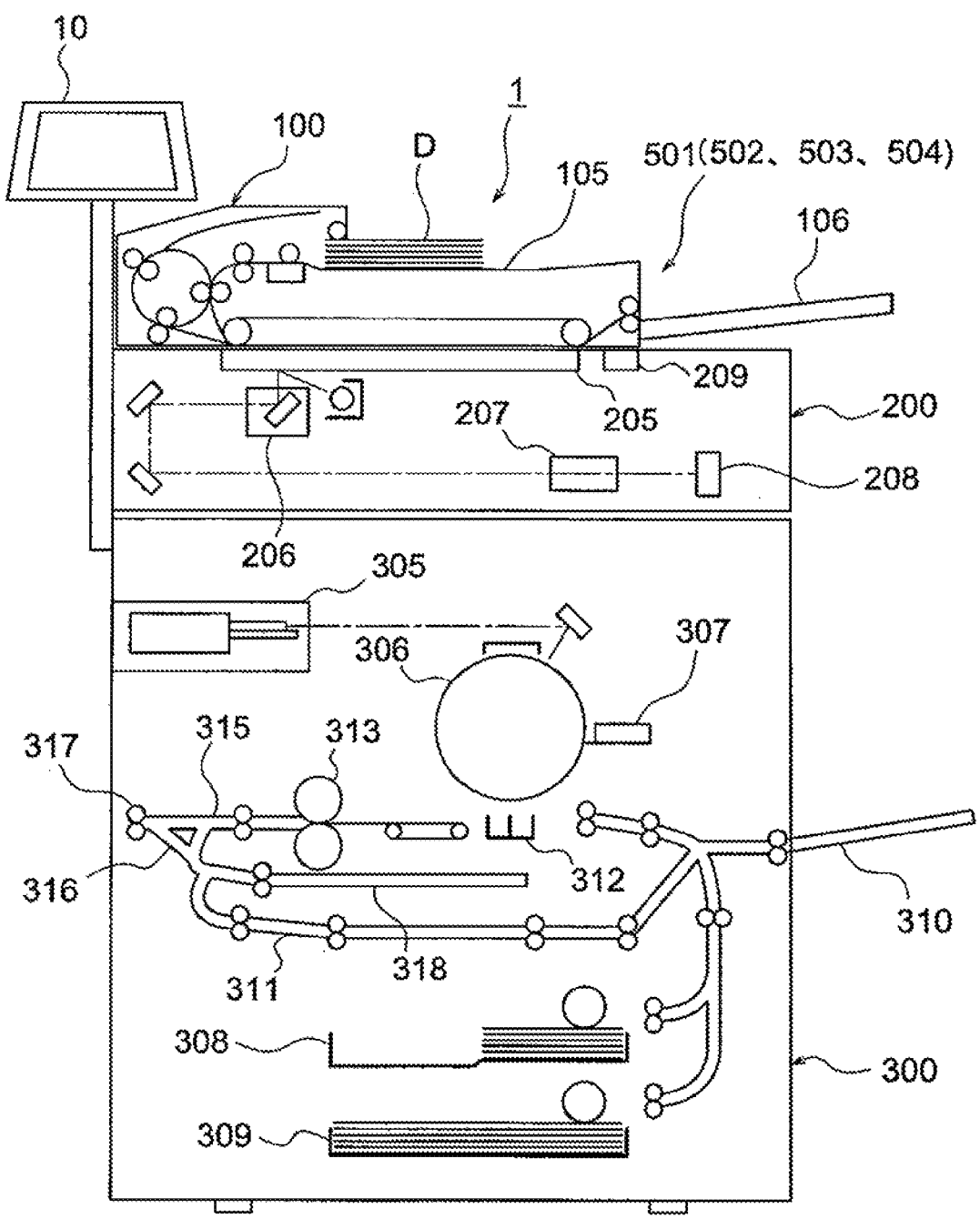
FIG. 2 illustrates an image forming apparatus according to an embodiment of the invention and illustrates a sectional view taken along a sheet conveying direction.

FIGS. 1A and 1B illustrate an appearance of an image forming apparatus according to an exemplary embodiment of the invention. FIG. 1A illustrates a perspective view of an appearance of the image forming apparatus, and FIG. 1B illustrates a development of an original conveying apparatus of the image forming apparatus. FIG. 2 illustrates the image forming apparatus and illustrates a sectional view taken along a sheet conveying direction.

Referring to FIGS. 1 and 2, an electrophotographic image forming apparatus 1 is used while installed on a floor, and the image forming apparatus 1 has copying machine, facsimile, and printer functions to form an image on a sheet.

The image forming apparatus 1 includes one of pieces of image reading apparatus 501, 502, 503, and 504 according to first to fourth embodiments and an image forming portion 300 which is of a main body of the image forming apparatus.

Each of the pieces of image reading apparatus 501, 502, 503, and 504 of the first to fourth embodiments includes an original base plate 205, an original conveying apparatus 100, and a reading portion 200. An original is placed on the original base plate 205 which is of an original base plate.

The original conveying apparatus 100 which is of an original pressing portion is connected to the reading portion 200 by a coupling mechanism (not illustrated), and the reading portion 200 is equipped with the original conveying apparatus 100 while the original conveying apparatus 100 can automatically be opened and closed around a rotating axis 80 with respect to the original base plate 205 by operation from an operation portion 10. In the closed state, the original conveying apparatus 100 presses the original against the original base plate 205. A platen (not illustrated) having only a function of holding the original to the original base plate 205 may be used instead of the original conveying apparatus 100. Accordingly, the original pressing portion is not limited to the original conveying apparatus 100, but any apparatus may be used as long as the apparatus opens and closes the original base plate 205 to press the original against the original base plate 205.

The reading portion 200 which is of an image reading portion reads an image of the original which is pressed against the original base plate 205 by the original conveying apparatus 100.

The image forming portion 300 includes the operation portion 10, and the operation portion 10 provides an instruction for setting an action mode of the image forming apparatus and an instruction for opening and closing the original conveying apparatus 100. The image forming portion 300 which is of the image forming portion forms the image on the sheet based on information on the image read by the image reading apparatus 501 and an image forming condition fed into the operation portion 10. Therefore, the image forming apparatus 1 has the function as the copying machine or printer.

The image forming portion 300 forms the image on the sheet based on the image information from the outside, and the image forming portion 300 or the image reading apparatus 501 transmits the information on the image read by the image reading apparatus to another image forming apparatus. Therefore, the image forming apparatus 1 has the function as the facsimile or printer.

The image forming apparatus 1 starts the action according to the mode set by the operation portion 10. An opening and closing detection sensor 209 detects whether or not the original conveying apparatus 100 closes the original base plate 205. When the opening and closing detection sensor 209 detects that the original conveying apparatus 100 closes the original base plate 205, the original conveying apparatus 100 starts the feed of originals D set on an original tray 105 from a front page, conveys the original D onto the original base plate 205, and stops the original D on the original base plate 205. Then, a scanner unit 206 is moved from the left to the right of FIG. 2 under the original base plate 205, the original D is illuminated from below the original base plate 205, and light reflected from the original D is accepted to read the image of the original D. The original D whose image is read is discharged to a sheet discharge tray 106.

The light accepted by the scanner unit 206 is sent to an image sensor 208 through a lens 207, and the image sensor 208 converts the light into an electric signal. An image processing portion 410 (FIG. 5) performs image processing to the image information converted into the electric signal. Then, while the image information is stored in a hard disk 413 (FIG. 5), the image information is transmitted to an exposure controlling portion 305 (FIG. 2) through an image forming controlling portion (printer controlling portion) 301.

The exposure controlling portion 305 emits a laser beam in response to an image signal. A previously charged photosensitive drum 306 is irradiated with the laser beam, and an electrostatic latent image is formed on the photosensitive drum 306. A development device 307 develops the electrostatic latent image to form a toner image. A transfer portion 312 transfers the toner image on the photosensitive drum 306 to the sheet fed from one of cassettes 308 and 309, a manual sheet feeding portion 310, and a duplex conveying path 311.

A fixing portion 313 fixes the toner image onto the sheet to which the toner image is transferred. The sheet passing through the fixing portion 313 is tentatively guided from a path 315 to a path 318 by a switch member (not illustrated), switchback conveyance is performed to the sheet after a rear end of the sheet passed through the path 315, and the sheet is guided from a path 316 to a discharge roller 317. The sheet to which the toner image is transferred is discharged from the discharge roller 317 to the image forming portion 300 with an image forming surface orientated downward (in a facedown state)

Figure 4:
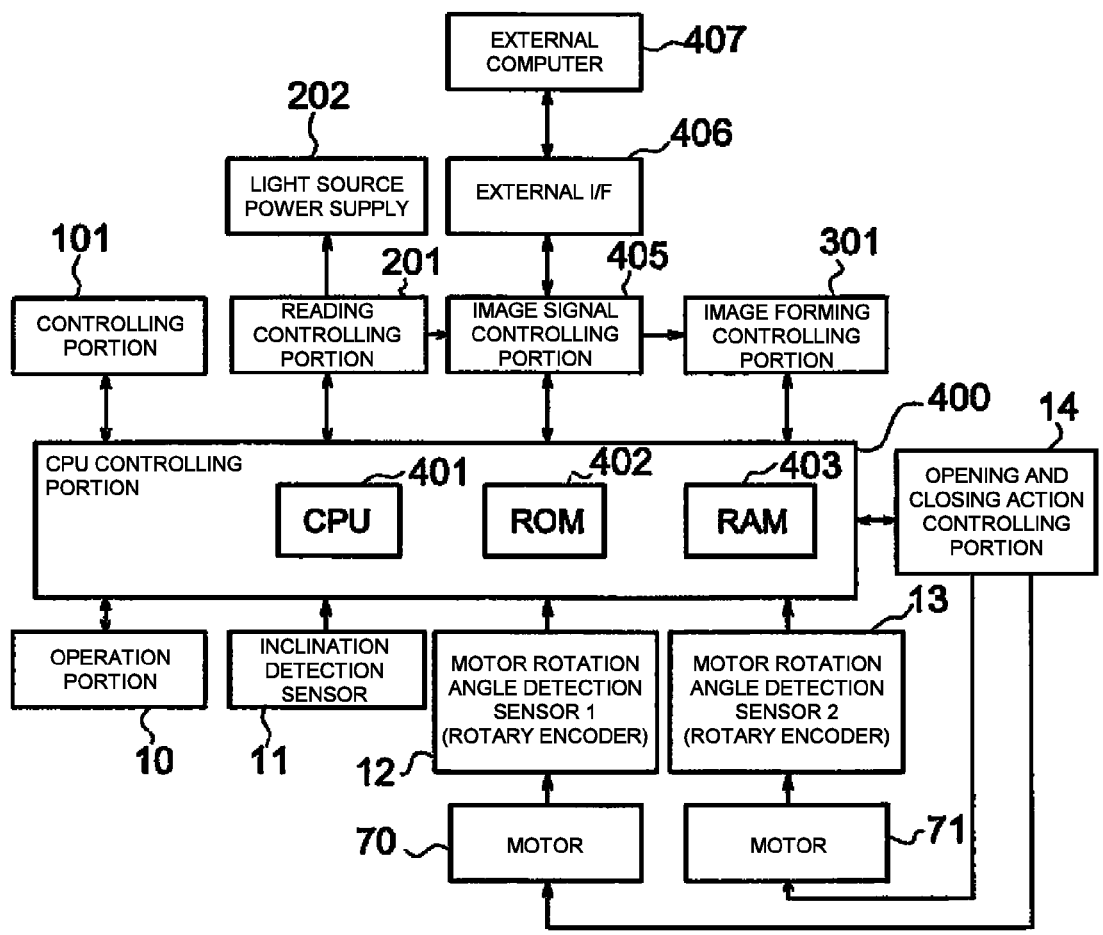
FIG. 4 illustrates a block diagram for controlling an image forming apparatus according to an embodiment of the invention.

FIG. 4 illustrates a block diagram for controlling the image forming apparatus.

An electric motor such as a stepping motor and a hydraulic motor, which perform rotational motion, can be cited as an example of a driving source which opens and closes the original conveying apparatus 100 with respect to the reading portion 200. A cylinder such as a hydraulic cylinder, which performs linear motion, can also be cited as an example of the driving source. In the case where the driving source is the motor, a rotation angle of the motor becomes a driving amount. In the case where the driving source is the cylinder, a movement of a piston located inside the cylinder becomes the driving amount. In the following embodiments, the stepping motor is used as the driving source which is of a driving portion. However, the driving source is not limited to the stepping motor, but the hydraulic motor or the cylinder may be used as the driving source.

A CPU controlling portion 400 which is of a controlling portion includes CPU 401. The CPU controlling portion 400 controls an original conveying apparatus controlling portion 101, a reading controlling portion 201, an image signal controlling portion 405, an image forming controlling portion 301, and an external I/F 406 based on a program stored in ROM 402 and the setting of the operation portion 10.

RAM 403 is used for an area where control data is tentatively retained or a work area of computation associated with the control. The external I/F 406 is an interface between the image forming apparatus and an external computer 407. The external I/F 406 expands print data into the image and supplies the image to the image signal controlling portion 405.

The CPU controlling portion 400 controls an opening and closing action controlling portion 14 based on information on an inclination of the original conveying apparatus 100, which is obtained by an inclination detection sensor 11, information on a rotation angle of the motor, which is obtained by motor rotation angle detection sensors 12 and 13, and an input instruction from the operation portion 10. A rotary encoder is used in the motor rotation angle detection sensors 12 and 13 of the original conveying apparatus 100 of the embodiment. Hereinafter, the motor rotation angle detection sensor is referred to as rotary encoder.

The original conveying apparatus controlling portion 101 controls the original conveying apparatus 100, the reading controlling portion 201 controls the reading portion 200, the image forming controlling portion 301 controls the image forming portion 300, and the opening and closing action controlling portion 14 controls automatic opening and closing action of the original conveying apparatus 100.

The reading controlling portion 201 supplies the image read by the image sensor 208 (FIG. 2) to the image signal controlling portion 405, and the image supplied from the image signal controlling portion 405 to the image forming controlling portion 301 is fed into the exposure controlling portion 305 (FIG. 2).

Figure 5:
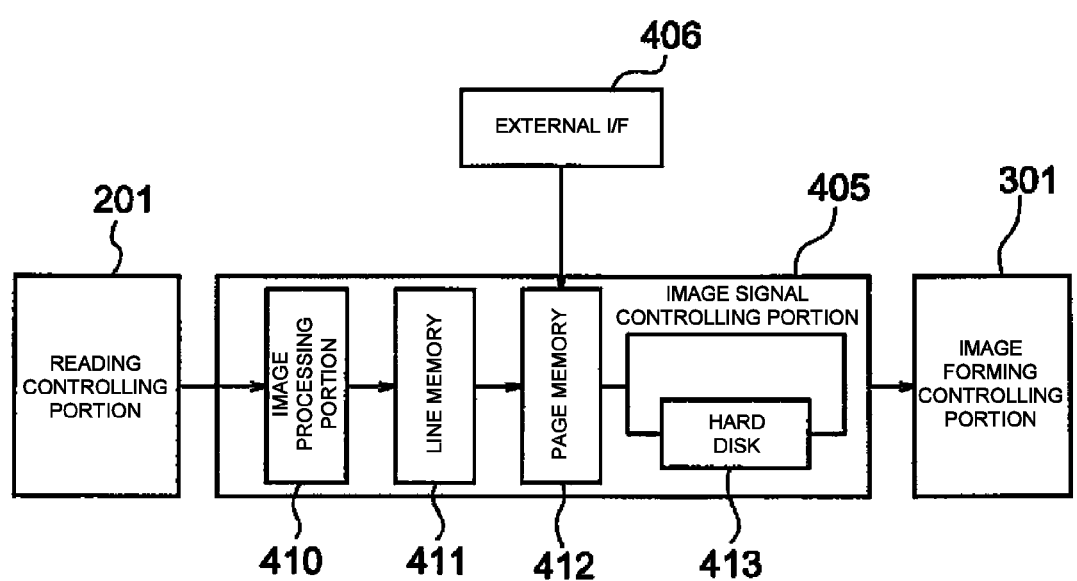
FIG. 5 illustrates an internal structure of an image signal controlling portion.

FIG. 5 illustrates an internal structure of the image signal controlling portion 405. An image processing portion 410 performs an image correction process to the information on the read image from the reading controlling portion 201, or the image processing portion 410 performs an edit process to the information on the read image according to the setting of the operation portion 10. A line memory 411 performs a mirror image process in which a main scanning direction is interchanged. The image of the line memory 411 is supplied to the image forming controlling portion 301 through a page memory 412. A hard disk 413 is used if needed when the order of the pages are replaced.

(Image Reading Apparatus of First Embodiment)

An image reading apparatus 501 according to a first embodiment is configured such that a rotation angular velocity $\omega_2$ of a motor 71 is matched with a rotation angular velocity $\omega_1$ (FIGS. 7A and 7B) of a motor 70 (FIG. 3) which opens and closes the original conveying apparatus 100.

Figure 3:
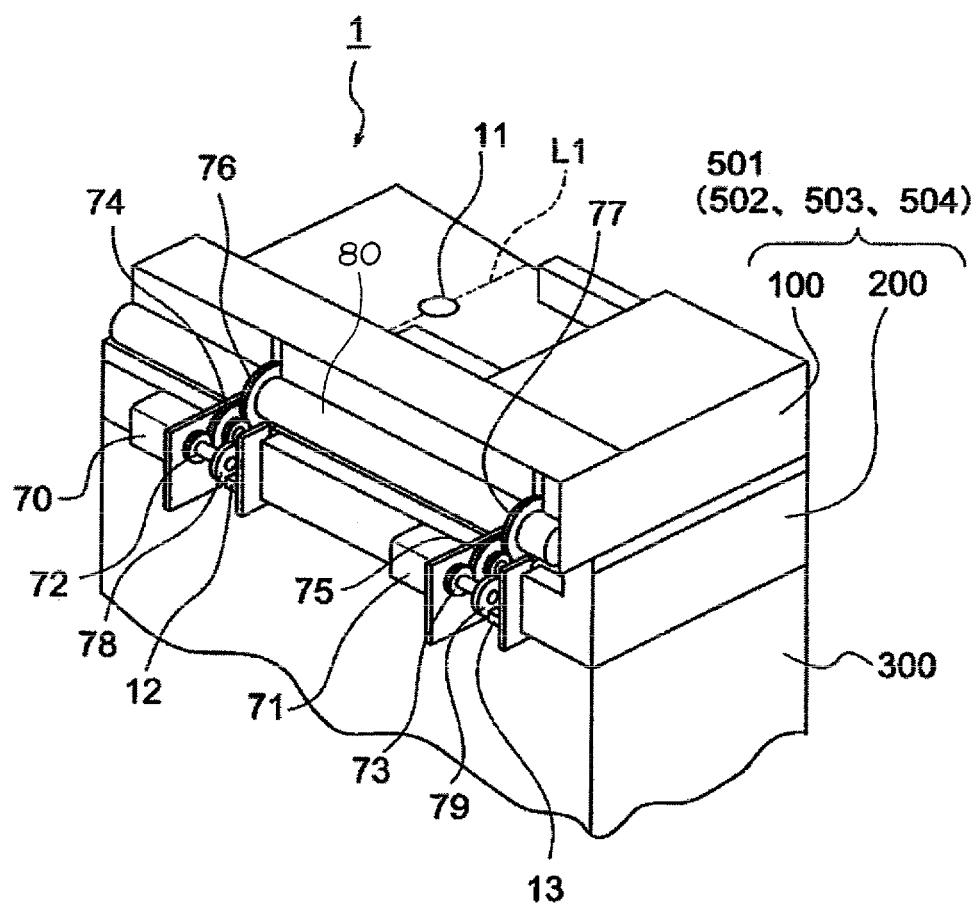
FIG. 3 illustrates a perspective view in a neighborhood of a motor in an image reading apparatus according to an embodiment of the invention.

In FIGS. 1 to 3, the original conveying apparatus 100 is provided in the reading portion 200 to automatically open and close the reading portion 200. Plural motors 70 and 71 and the operation portion 10 are provided in the backside of the reading portion 200. The plural motors 70 and 71 are of the driving portion for opening and closing the original conveying apparatus 100. The stepping motors are used as the motors 70 and 71, and the stepping motors can freely change a speed and a rotation direction according to computation output of the opening and closing action controlling portion 14 (FIG. 4).

The opening and closing action controlling portion 14 performs the computation based on input signals from the rotary encoders 12 and 13 and the inclination detection sensor 11. Specific contents of the control computation will be described later.

Driving gears 72 and 73 of the motors 70 and 71 (FIG. 3) are engaged with idle gears 74 and 75 respectively. Driven gears 76 and 77 engaged with the idle gears 74 and 75 are provided below the original conveying apparatus 100. An opening angle of the original conveying apparatus 100 is changed according to the rotations of the driven gears 76 and 77.

As illustrated in FIG. 3, the rotary encoders 12 and 13 which are of plural actuation state detection portions successively detect rotation angles $\theta_1$ and $\theta_2$ (FIG. 7A) (actuation state) of the motors 70 and 71. The rotary encoders 12 and 13 include slit discs 78 and 79 provided coaxial with axial centers of the motors 70 and 71 and sensors detecting slits of the slit discs 78 and 79 respectively.

A gyro-sensor is used as the inclination detection sensor 11. The inclination detection sensor 11 is placed in a barycenter of the original conveying apparatus 100.

The inclination detection sensor 11 which is of an inclination detection portion detects a right-left direction inclination angular velocity $\omega_3$ (FIG. 7) of the original conveying apparatus 100 based on a front-back direction axis L1 (FIG. 3) passing through the barycenter of the original conveying apparatus 100 in opening and closing the original conveying apparatus 100. The front-back direction axis L1 is vertical to the rotating axis 80 of the original conveying apparatus 100.

An integral operation circuit 14d (FIG. 7) performs integration to the detected inclination angular velocity $\omega_3$ of the original conveying apparatus 100 to convert the inclination angular velocity $\omega_3$ into an inclination angle $\theta_3$ of the original conveying apparatus 100. In the opening and closing action controlling portion 14, a determination portion 14c (FIG. 5) uses the inclination angle $\theta_3$ of the original conveying apparatus 100 to determine whether or not the matching of the rotation angular velocity of the motor 71 with the rotation angular velocity of the motor 70 is started.

Differential operation circuits 14e and 14f (FIG. 7) perform derivation to the rotation angles $\theta_1$ and $\theta_2$ of the motors 70 and 71 to convert the rotation angles $\theta_1$ and $\theta_2$ into rotation angular velocities $\omega_1$ and $\omega_2$ of the motors 70 and 71 respectively.

A control computation portion 14b matches the rotation angular velocity $\omega_2$ with the rotation angular velocity $\omega_1$ to reduce a variation in rotation angular velocity of the motor 71 to the motor 70 such that a difference between the rotation angular velocity $\omega_1$ and the rotation angular velocity $\omega_2$ detected by the rotary encoders 12 and 13 is eliminated.

Contents of the control computation performed by the opening and closing action controlling portion 14 will be described with reference to FIG. 7.

Figure 7A:
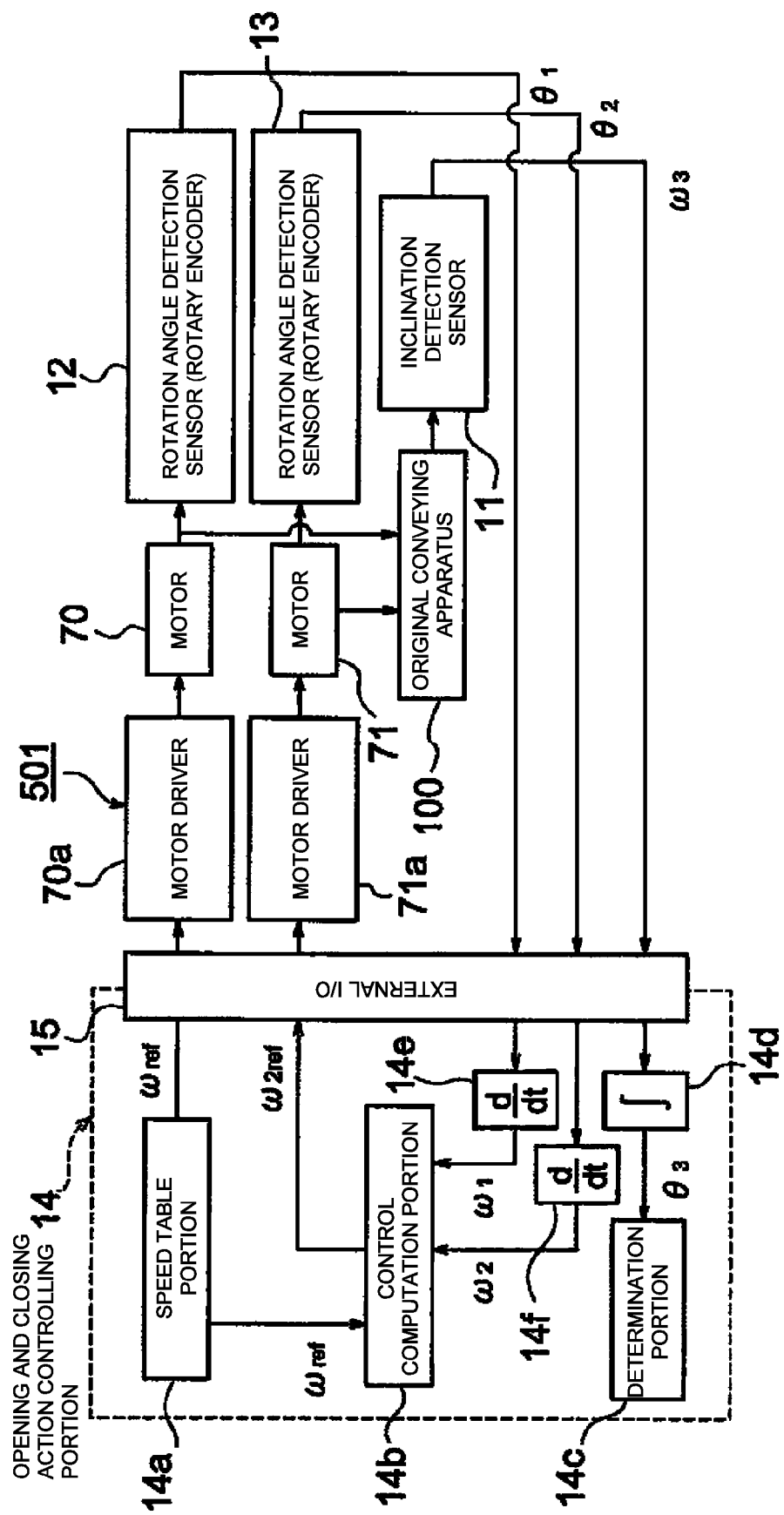
FIG. 7A illustrates a block diagram for controlling an image forming apparatus according to a first embodiment of the invention and illustrates a signal flow in performing control computation.

FIG. 7A illustrates a signal flow in performing the control computation. The inclination angular velocity $\omega_3$ of the original conveying apparatus, which is detected by the inclination detection sensor 11, and the rotation angles $\theta_1$ and $\theta_2$ of the motors 70 and 71, which are detected by the rotary encoders 12 and 13 of the motors 70 and 71, are fed into the control computation portion 14b through an external I/O 15. The external I/O 15 digitizes the inclination angular velocity $\omega_3$ and the rotation angles $\theta_1$ and $\theta_2$ by converting the analog signal into digital information suitable to the control computation.

A speed table is previously stored in a speed table portion 14a which is of a storage portion, and the speed table indicates an opening and closing speed to an elapsed time after the motors 70 and 71 start the opening and closing action of the original conveying apparatus 100. The speed table portion 14a provides a speed command $\omega_{ref}$ to the motor driver 70a. The control computation portion 14b performs later-mentioned computation to the converted digital information, and the control computation portion 14b supplies a rotation angular velocity $\omega_{2ref}$ to the motor driver 71a. The rotation angular velocity $\omega_{2ref}$ matches the rotation angular velocity of the motor 71 with the actual rotation angular velocity $\omega_1$ of the motor 70. The speed commands $\omega_{ref}$ and $\omega_{2ref}$ are fed into the motor drivers 70a and 71a through the external I/O 15. The motor drivers 70a and 71a adjust driving frequencies of the motors 70 and 71 based on the speed commands $\omega_{ref}$ and $\omega_{2ref}$. As a result, the rotation speeds of the motors 70 and 71 are adjusted according to the driving frequencies adjusted by the motor drivers 70a and 71a.

Thus, when the vibration is generated in the original conveying apparatus 100 during the automatic opening and closing action, the image reading apparatus 501 detects the vibration information through the series of sequences, and the image reading apparatus 501 can perform the computation according to the vibration information to successively decrease the vibration of the original conveying apparatus.

Figure 7B:
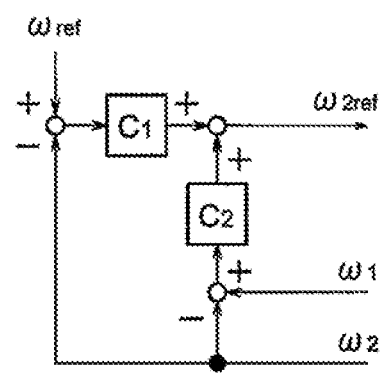
FIG. 7B illustrates control of an image forming apparatus according to a first embodiment of the invention and illustrates a flow example of control computation which can be applied to an opening and closing action controlling portion.

FIG. 7B illustrates a flow example of the control computation which can be applied to the opening and closing action controlling portion 14. In FIG. 7B, the letters $C_1$ and $C_2$ designate portions in which PID control is performed, and specific processing contents are expressed by Equations 1 and 2.

$$C_1(s) = K_{P1}\left(1 + \frac{1}{sT_{I1}} + \frac{sT_{D1}}{1+s\eta T_{D1}}\right) \quad \text{[Equation 1]}$$

$$C_2(s) = K_{P2}\left(1 + \frac{1}{sT_{I2}} + \frac{sT_{D2}}{1+s\eta T_{D2}}\right) \quad \text{[Equation 2]}$$

Where $K_{p1}$ and $K_{p2}$ are proportional gains, $T_{I1}$ and $T_{I2}$ are integral times, and $T_{D1}$ and $T_{D2}$ are derivative times. A designer appropriately sets these parameters. $\eta$ is a coefficient used in approximate derivation for the convenient sake, and $\eta \ll 1$. In the computation of $C_1$, the parameters are set so as to improve a following capability onto a certain target value.

In the opening and closing action controlling portion 14, the actual drive of the motor 70 follows the speed command $\omega_{ref}$ supplied from the previously set speed table portion 14a. In the computation of $C_2$, the parameters are set so as to reduce a time rate of change of certain information. In the opening and closing action controlling portion 14, the variation in rotation angular velocity of the motor 71 to the rotation angular velocity of the motor 70 is reduced. The letter $\omega_{2ref}$ designates the speed command to the motor 71. The letter $\omega_1$ designates the rotation angular velocity of the motor 70, which is detected by the rotary encoder 12, and the letter $\omega_2$ designates the rotation angular velocity of the motor 71, which is detected by the rotary encoder 13. The letter $\omega_{ref}$ designates the speed command based on the previously set speed table portion 14a, and the motor 70 is driven according to the speed command $\omega_{ref}$. The motor 71 is also configured so as to be able to follow the speed command $\omega_{ref}$ by the computation of $C_1$. The opening and closing action controlling portion 14 determines the difference between the rotation angular velocity $\omega_1$ of the motor 70 and the rotation angular velocity $\omega_2$ of the motor 71 to perform the computation of $C_2$, and the opening and closing action controlling portion 14 changes the rotation angular velocity of the motor 71 such that the variation in rotation angular velocity of the motor 71 to the rotation angular velocity of the motor 70 is reduced.

Using the above-described control system, the opening and closing action controlling portion 14 which is of a controlling portion controls the motors 70 and 71 based on the rotation angles $\theta_1$ and $\theta_2$ (actuation state) detected by the rotary encoders 12 and 13, which allows the inclination of the original conveying apparatus 100 to be corrected.

Alternatively, the rotation angular velocity of the motor 70 may be matched with the rotation angular velocity of the motor 71. Although the two motor are used in the first embodiment, at least three motors may be used. In such cases, the rotation angular velocities of the motors are matched with the rotation angular velocity of the one motor. In the case where the cylinders are used instead of the motors, the movements (actuation state) of the cylinders are detected to determine actuation speeds, and an actuation speed of one of the cylinders is matched with the actuation speed of the other cylinder.

Accordingly, the variation in rotation angular velocity between the motors is reduced in the original conveying apparatus 100, thereby eliminating the state in which the original conveying apparatus 100 is opened and closed in the inclined or deformed manner.

Therefore, the image reading apparatus of the first embodiment obtains the following effects. The original conveying apparatus can smoothly be opened and closed to reduce the noise. The overload generated in opening and closing the original conveying apparatus in the inclined or deformed manner can be decreased. When the original conveying apparatus is closed, the original can be pressed against the original base plate 205 to read the original while the position of the original is not substantially shifted. The original conveying apparatus hardly abuts on the original base plate 205 in the one-sided manner, so that reduce the noise caused by the one-sided abutment can be reduced.

Figure 6:
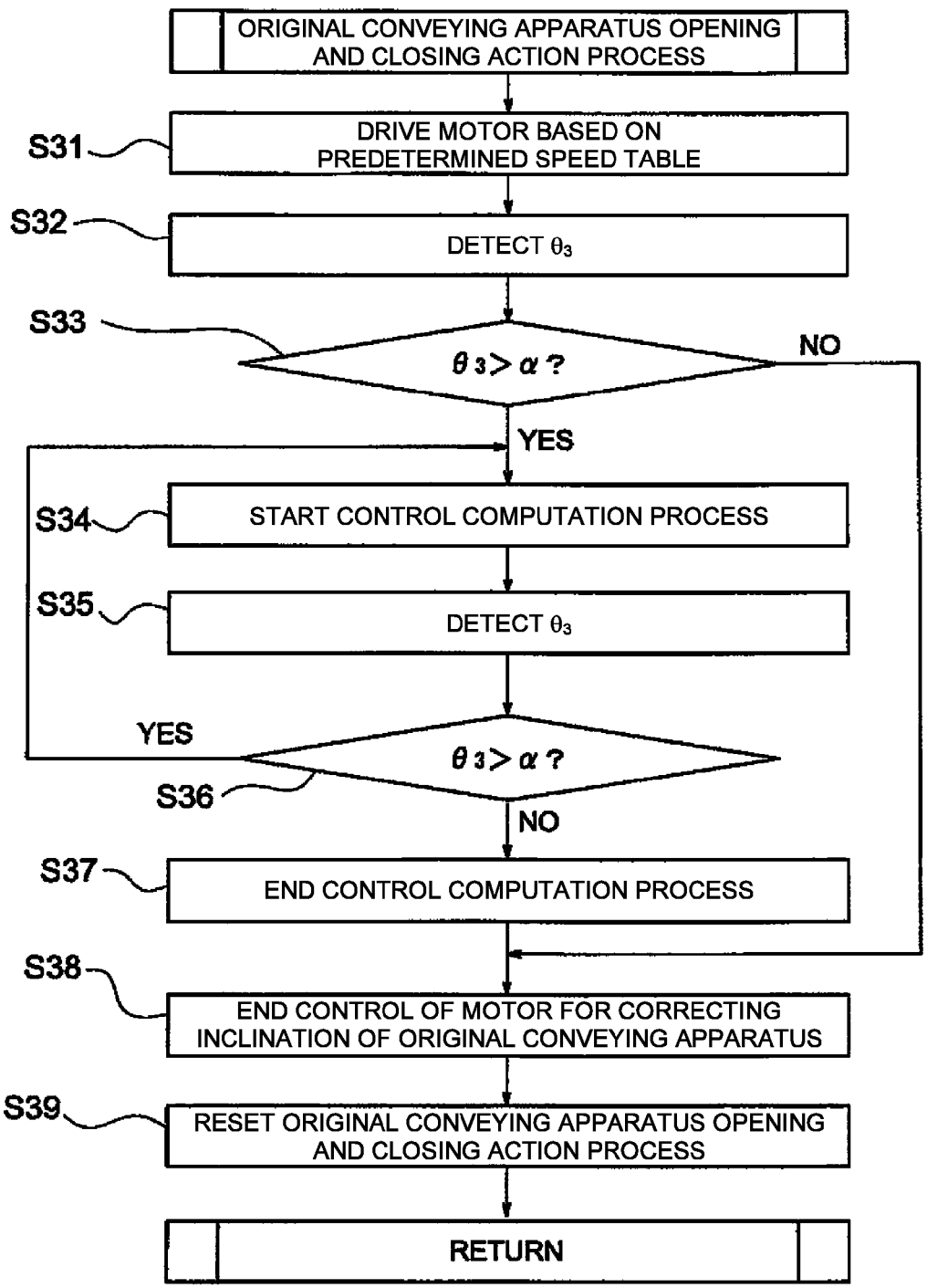
FIG. 6 illustrates a flowchart in which a control computation portion starts rotation angular velocity control action of a motor after an inclination angle of an original conveying apparatus is larger than a setting inclination angle in the image reading apparatus of FIGS. 1A and 1B.

The contents of the above-described computation do not include the inclination angle $\theta_3$ of the original conveying apparatus 100, which is detected by the inclination detection sensor 11. FIG. 6 illustrates a flowchart in which the control computation portion 14a starts the rotation angular velocity control action of the motors 70 and 71 when the inclination angle $\theta_3$ of the original conveying apparatus is larger than a setting inclination angle $\alpha$.

The opening and closing action controlling portion 14 drives the motors 70 and 71 according to the speed table portion 14a (S31). The inclination detection sensor 11 detects the inclination angular velocity $\omega_3$ of the original conveying apparatus 100 (S32). The integral operation circuit 14d (FIGS. 7A and 7B) performs the integration to convert the inclination angular velocity $\omega_3$ onto the inclination angle $\theta_3$ of the original conveying apparatus 100. When the inclination angle $\theta_3$ of the original conveying apparatus 100 is larger than the set inclination angle $\alpha$, the control computation portion 14b determines that the inclination angle about the front-back direction axis L1 (FIG. 3) passing through the barycenter of the original conveying apparatus is not lower than the set inclination angle $\alpha$ (YES in S33), and the control computation portion 14b decreases the inclination angle $\theta_3$. Therefore, the control computation portion 14b starts control such that the rotation angular velocity of the motor 71 is matched with the rotation angular velocity of the motor 70 (S34).

While the control computation portion 14b obtains the inclination angle $\theta_3$ (S35), the control computation portion 14b controls the rotations of the motors 70 and 71 such that the inclination angle $\theta_3$ becomes the set inclination angle $\alpha$ or less. When the inclination angle $\theta_3$ becomes the set inclination angle $\alpha$ or less (NO in S36), the control computation portion 14b determines that the inclination of the original conveying apparatus 100 about the front-back direction axis L1 is decreased, and the control computation portion 14b ends the computation for matching the rotation angular velocity of the motor 70 with the rotation angular velocity of the motor 71 (S37). The control computation portion 14b ends the control for matching the rotation angular velocity of the motor 70 with the rotation angular velocity of the motor 71 (control for correcting the inclination of the original conveying apparatus) (S38), and the control computation portion 14b prepares the next motor control based on the inclination angle $\theta_3$ (S39).

Therefore, only when the inclination or the vibration around the front-back direction axis L1 is increased in the original conveying apparatus, the image reading apparatus can correct the inclination of the original conveying apparatus to reduce the vibration.

(Image Reading Apparatus of Second Embodiment)

The image reading apparatus 501 of the first embodiment is configured such that the rotation angular velocity $\omega_1$ of the motor 70 is matched with the rotation angular velocity $\omega_2$ of the motor 71. On the other hand, an image reading apparatus 502 according to a second embodiment is configured such that the rotation angular velocity $\omega_1$ of the motor 70 and the rotation angular velocity $\omega_2$ of the motor 71 are mutually matched with each other. Therefore, the image reading apparatus 502 of the second embodiment differs from the image reading apparatus 501 of the first embodiment in an opening and closing action controlling portion 114 and the flow of the control computation. Only the different points will be described with reference to FIGS. 8A and 8B.

Figure 8A:
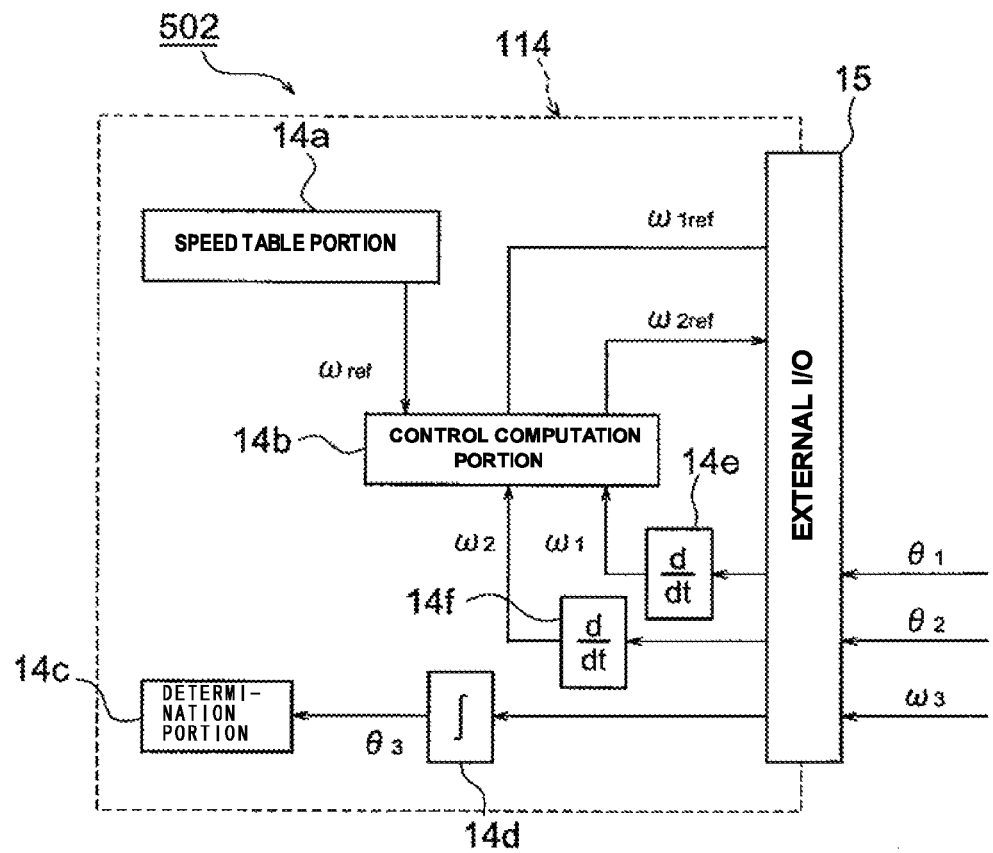
FIG. 8A illustrates a block diagram for controlling an image forming apparatus according to a second embodiment of the invention and illustrates a signal flow in performing control computation.
Figure 8B:
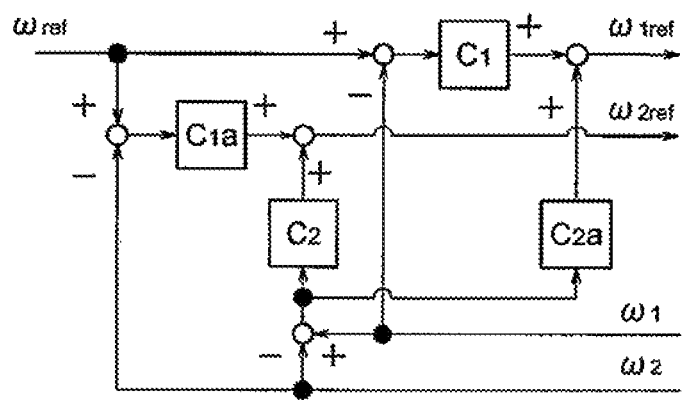
FIG. 8B illustrates control of an image forming apparatus according to a second embodiment of the invention and illustrates a flow example of control computation which can be applied to an opening and closing action controlling portion.

FIG. 8A illustrates a block diagram for controlling the image forming apparatus and illustrates a signal flow in performing the control computation. FIG. 8B illustrates a flow example of the control computation which can be applied to the opening and closing action controlling portion.

The control computation portion 14b compares the rotation angular velocities $\omega_1$ and $\omega_2$ of the motors 70 and 71, which are detected by the rotary encoders 12 and 13, to the speed command $\omega_{ref}$ supplied from the previously set speed table portion 14a, and the control computation portion 14b performs the control computation so as to reduce the differences between the rotation angular velocities $\omega_1$ and $\omega_2$ of the motors 70 and 71 and the speed command $\omega_{ref}$. Accordingly, in the image reading apparatus of the second embodiment, the control computation portion 14b performs the control computation to reduce the differences such that the variation in rotation angular velocity between the motors 70 and 71 is decreased in the actual drive.

The inclination angular velocity $\omega_3$ of the original conveying apparatus, which is detected by the inclination detection sensor 11, and the rotation angles $\theta_1$ and $\theta_2$ of the motors 70 and 71, which are detected by the rotary encoders 12 and 13 of the motors 70 and 71, are fed into the control computation portion 14b through the external I/O 15. The external I/O 15 digitizes the inclination angular velocity $\omega_3$ and the rotation angles $\theta_1$ and $\theta_2$ by converting the analog signal into the digital information suitable to the control computation. The control computation portion 14b performs later-mentioned computation to the converted digital information to supply the speed commands $\omega_{ref}$ and $\omega_{2ref}$ to the motors 70 and 71. The speed commands $\omega_{ref}$ and $\omega_{2ref}$ are fed into the motor drivers 70a and 71a through the external I/O 15. The motor drivers 70a and 71a adjust the driving frequencies of the motors 70 and 71 based on the speed commands $\omega_{ref}$ and $\omega_{2ref}$. As a result, the rotation speeds of the motors 70 and 71 are adjusted according to the driving frequencies adjusted by the motor drivers 70a and 71a.

Thus, when the vibration is generated in the original conveying apparatus 100 during the automatic opening and closing action, the image reading apparatus 502 detects the vibration information through the series of sequences, and the image reading apparatus 502 can perform the computation according to the vibration information to successively decrease the vibration of the original conveying apparatus.

FIG. 8B illustrates a flow example of the control computation which can be applied to an opening and closing action controlling portion 114. In FIG. 8B, the letters $C_1$, $C_2$, $C_{1a}$, and $C_{2a}$ designate portions in which PID control is performed, specific processing contents of $C_1$ and $C_2$ are expressed by Equations 1 and 2, and specific processing contents of $C_{1a}$ and $C_{2a}$ are expressed by Equations 3 and 4.

$$C_{1a}(s) = K_{P1a}\left(1 + \frac{1}{sT_{11a}} + \frac{sT_{D1a}}{1 + s\eta T_{D1a}}\right) \quad \text{[Equation 3]}$$

$$C_{2a}(s) = K_{P2a}\left(1 + \frac{1}{sT_{12a}} + \frac{sT_{D2a}}{1 + s\eta T_{D2a}}\right) \quad \text{[Equation 4]}$$

Where $K_{P1a}$ and $K_{P2a}$ are proportional gains, $T_{I1a}$ and $T_{I2a}$ are integral times, and $T_{D1a}$ and $T_{D2a}$ are derivative times. A designer appropriately sets these parameters. $\eta$ is a coefficient used in approximate derivation for the convenient sake, and $\eta \ll 1$. In the computation of $C_{1a}$, the parameters are set so as to improve a following capability onto a certain target value.

In the opening and closing action controlling portion 114, the motors 70 and 71 are controlled such that the actual drive of the motors 70 and 71 follows the speed command $\omega_{ref}$ supplied from the previously set speed table portion 14a, thereby reducing the variation in rotation angular velocity between the motors 70 and 71.

In the computations of $C_2$ and $C_{2a}$, the parameters are set so as to reduce a time rate of change of certain information. The letter $\omega_{1ref}$ designates the speed command to the motor 70, and the letter $\omega_{2ref}$ designates the speed command to the motor 71. The letter $\omega_1$ designates the rotation angular velocity of the motor 70, which is detected by the rotary encoder 12, and the letter $\omega_2$ designates the rotation angular velocity of the motor 71, which is detected by the rotary encoder 13. The letter $\omega_{ref}$ designates the speed command based on the previously set speed table portion 14a, and the motor 70 is driven according to the speed command $\omega_{ref}$. The motor 71 is also configured so as to be able to follow the speed command $\omega_{ref}$ by the computations of $C_1$ and $C_{1a}$. The opening and closing action controlling portion 114 determines the difference between the rotation angular velocity $\omega_1$ of the motor 70 and the rotation angular velocity $\omega_2$ of the motor 71 to perform the computations of $C_2$ and $C_{2a}$, and the opening and closing action controlling portion 114 changes the rotation angular velocities of the motors 70 and 71 such that the variation in rotation angular velocity between the motors 70 and 71 is reduced.

Because the above-described control system performs the control computation, the opening and closing action controlling portion 114 which is of the controlling portion drives the motors 70 and 71 according to the speed table portion 14a to match the rotation angular velocities of the motors 70 and 71 with each other.

As a result, the variation in rotation angular velocity between the motors is reduced in the original conveying apparatus 100, thereby eliminating the state in which the original conveying apparatus 100 is opened and closed in the inclined or deformed manner. Accordingly, in the image reading apparatus of the second embodiment, in addition to the same effect as the image reading apparatus of the first embodiment, the inclination and deformation of the original conveying apparatus can corrected more rapidly compared with the image reading apparatus of the first embodiment.

The contents of the above-described computation do not include the inclination angle $\theta_3$ of the original conveying apparatus 100, which is detected by the inclination detection sensor 11. Alternatively, similarly to the opening and closing action controlling portion 14 of the image reading apparatus of the first embodiment, the rotations of the motors 70 and 71 may be controlled when the inclination angle $\theta_3$ of the original conveying apparatus becomes larger than a predetermined inclination angle $\alpha$.

Although the two motor are used in the second embodiment, at least three motors may be used. In such cases, it is necessary that the rotation angular velocities of the three motors be matched with one another. In the case where the cylinders are used instead of the motors, the movements (actuation state) of the cylinders are detected to determine the actuation speeds, and the actuation speeds of the plural cylinders are matched with one another.

(Image Reading Apparatus of Third Embodiment)

In an image reading apparatus 503 according to a third embodiment, the rotation angular velocity $\omega_1$ of the motor 70 is matched with the rotation angular velocity $\omega_2$ of the motor 71, and the rotation angular velocity $\omega_2$ of the motor 71 is controlled in consideration of an inclination angular velocity $\omega_3$ of the original conveying apparatus 100, which is detected by the inclination detection sensor 11.

Therefore, in the image reading apparatus of the third embodiment, the variation in speed about the front-back direction axis L1 (FIG. 3) passing through the barycenter of the original conveying apparatus can be reduced in the original conveying apparatus during the opening and closing action.

Figure 9A:
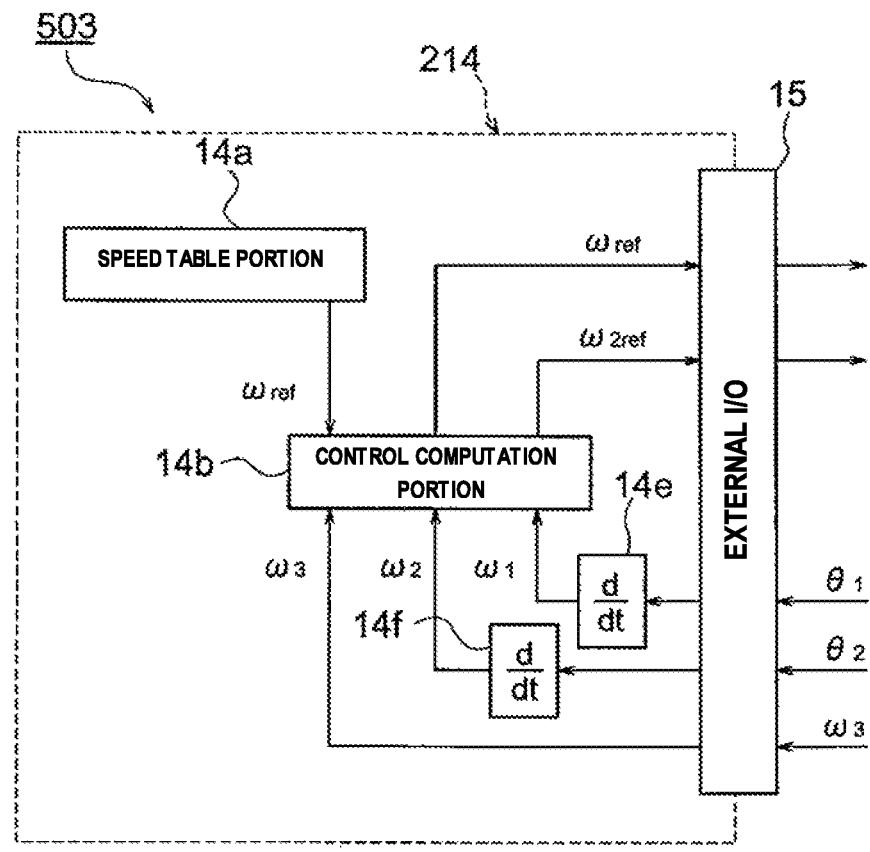
FIG. 9A illustrates a block diagram for controlling an image forming apparatus according to a third embodiment of the invention and illustrates a signal flow in performing control computation.
Figure 9B:
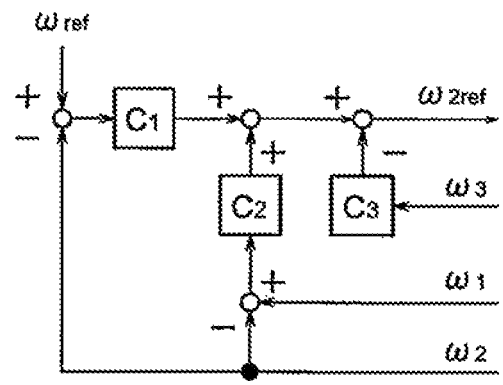
FIG. 9B illustrates control of an image forming apparatus according to a third embodiment of the invention and illustrates a flow example of control computation which can be applied to an opening and closing action controlling portion.

FIGS. 9A and 9B illustrate the control of the image reading apparatus of the third embodiment. FIG. 9A partially illustrates a block diagram for controlling the image forming apparatus and illustrates a signal flow in performing the control computation. FIG. 9B illustrates a flow example of the control computation which can be applied to the opening and closing action controlling portion.

FIG. 9B illustrates a flow example of the control computation which can be applied to an opening and closing action controlling portion 214 which is of the controlling portion. In FIG. 9B, the letters $C_1$, $C_2$, and $C_3$ designate portions in which the PID control is performed, specific processing contents of $C_1$ and $C_2$ are expressed by Equations 1 and 2, and specific processing contents of $C_3$ are expressed by Equation 5.

$$C_3(s) = K_{P3}\left(1 + \frac{1}{sT_{I3}} + \frac{sT_{D3}}{s\eta T_{D3}}\right) \quad \text{[Equation 5]}$$

Where $K_{P3}$ is a proportional gain, $T_{I3}$ is an integral time, and $T_{D3}$ is a derivative time. A designer appropriately sets these parameters. In the computation of $C_3$, the parameters are set so as to reduce the vibration of the original conveying apparatus.

In the opening and closing action, although the original conveying apparatus 100 exhibits an elastic behavior, the elastic behavior of the original conveying apparatus 100 is not always reflected on the rotation angular velocities $\omega_1$ and $\omega_2$ of the motors 70 and 71. Accordingly, even if the rotation angular velocities $\omega_1$ and $\omega_2$ are set in the control computation, the elastic behavior of the original conveying apparatus cannot be controlled. Therefore, in the image reading apparatus of the third embodiment, the motors 70 and 71 are controlled in order to suppress the elastic behavior of the original conveying apparatus by setting the inclination angular velocity $\omega_3$ of the original conveying apparatus in the control computation. That is, the control computation portion 14b changes the rotation angular velocity $\omega_1$ of the motor 70 according to the variation in inclination angular velocity $\omega_3$ of the original conveying apparatus 100, and the motor 71 is caused to follow the drive of the motor 70 to respond to the variation in inclination angular velocity $\omega_3$ of the original conveying apparatus 100.

In the image reading apparatus 503 of the third embodiment, in addition to the effects similar to those of the pieces of image reading apparatus of the first and second embodiments, the variation in speed about the front-back direction axis L1 (FIG. 3) passing through the barycenter of the original conveying apparatus can be reduced in the original conveying apparatus 100 during the opening and closing action. The vibrations of the original conveying apparatus, which are caused by other factors, can also be reduced. Examples of other factors include a free vibration of the original conveying apparatus, which is generated during the opening and closing action, and resonance between the driving frequencies of the motors 70 and 71 and an eigenfrequency of the original conveying apparatus 100.

Alternatively, the rotation angular velocity of the motor 70 may be matched with the rotation angular velocity of the motor 71. Although the two motor are used in the third embodiment, at least three motors may be used. In such cases, the rotation angular velocities of the motors are matched with the rotation angular velocity of the one motor. In the case where the cylinders are used instead of the motors, the movements (actuation state) of the cylinders are detected to determine actuation speeds, and an actuation speed of one of the cylinders is matched with the actuation speed of the other cylinder.

(Image Reading Apparatus of Fourth Embodiment)

In an image reading apparatus 504 according to a fourth embodiment, the rotation angular velocities $\omega_1$ and $\omega_2$ of the motors 70 and 71 are matched with each other, and the rotation angular velocities $\omega_1$ and $\omega_2$ of the motors are controlled in consideration of the inclination angular velocity $\omega_3$ of the original conveying apparatus, which is detected by the inclination detection sensor 11.

Figure 10A:
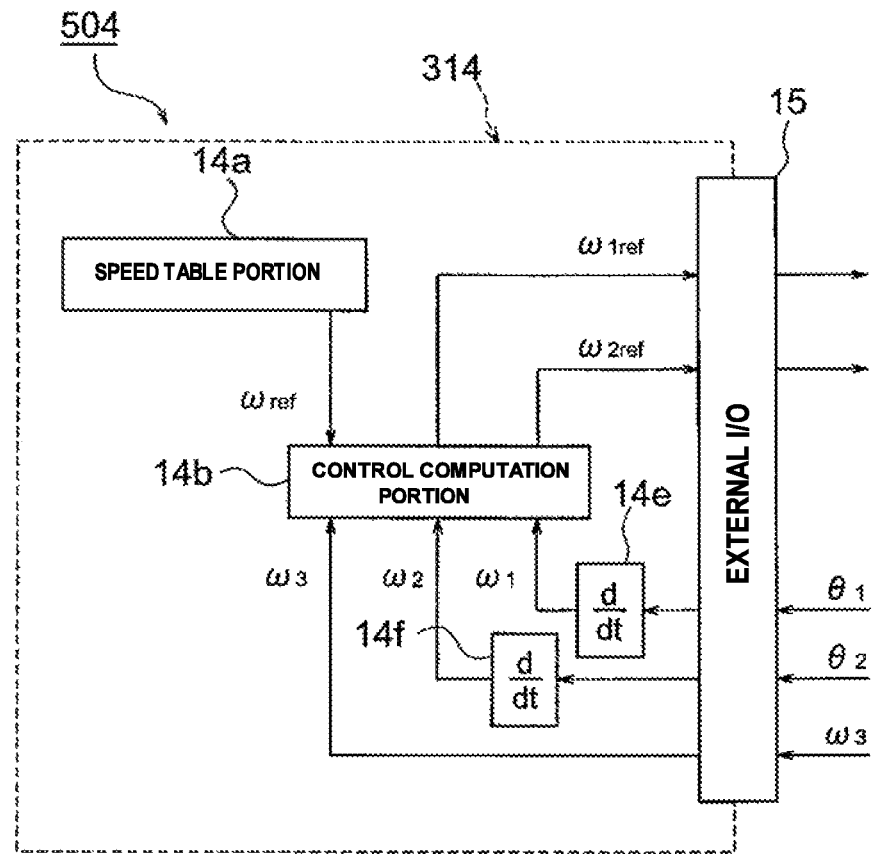
FIG. 10A illustrates a block diagram for controlling an image forming apparatus according to a fourth embodiment of the invention and illustrates a signal flow in performing control computation.
Figure 10B:
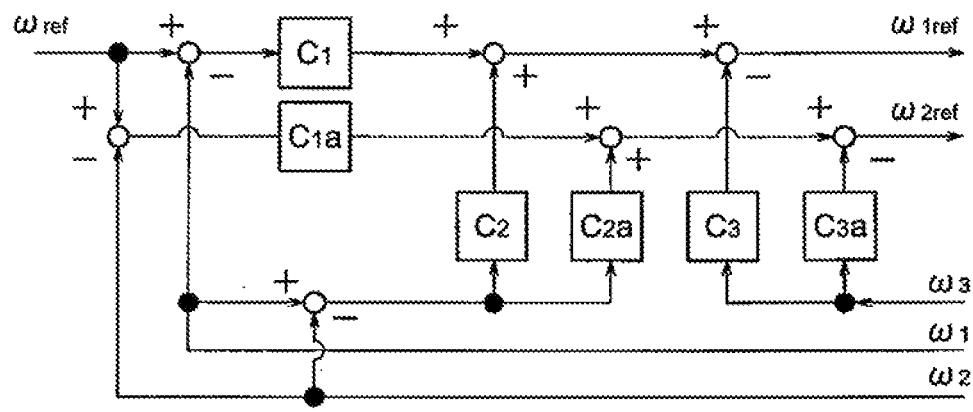
FIG. 10B illustrates control of an image forming apparatus according to a fourth embodiment of the invention and illustrates a flow example of control computation which can be applied to an opening and closing action controlling portion.

FIGS. 10A and 10B illustrate the control of the image reading apparatus of the fourth embodiment. FIG. 10A partially illustrates a block diagram for controlling the image forming apparatus and illustrates a signal flow in performing the control computation. FIG. 10B illustrates a flow example of the control computation which can be applied to an opening and closing action controlling portion 314.

In the image reading apparatus 504 of the fourth embodiment, the variation in speed about the front-back direction axis L1 (FIG. 3) passing through the barycenter of the original conveying apparatus can be reduced in the original conveying apparatus during the opening and closing action.

In FIG. 10B, the letters $C_1$, $C_{1a}$, $C_2$, $C_{2a}$, $C_3$, and $C_{3a}$ designate portions in which the PID control is performed, specific processing contents of $C_1$, $C_{1a}$, $C_2$, $C_{2a}$, and $C_3$ are expressed by Equations 1 to 5, and specific processing contents of $C_{3a}$ are expressed by Equation 6.

$$C_{3a}(s) = K_{P3a}\left(1 + \frac{1}{sT_{I3a}} + \frac{sT_{D3a}}{1 + s\eta T_{D3a}}\right) \quad \text{[Equation 6]}$$

Where $K_{P3a}$ is a proportional gain, $T_{I3a}$ is an integral time, and $T_{D3a}$ is a derivative time. A designer appropriately sets these parameters. In the computation of $C_{3a}$, the parameters are set so as to reduce the vibration of the original conveying apparatus.

In the opening and closing action, although the original conveying apparatus 100 exhibits the elastic behavior, the elastic behavior of the original conveying apparatus 100 is not always reflected on the rotation angular velocities $\omega_1$ and $\omega_2$ of the motors 70 and 71. Accordingly, even if the rotation angular velocities $\omega_1$ and $\omega_2$ are set in the control computation, the elastic behavior of the original conveying apparatus cannot be controlled. Therefore, in the image reading apparatus of the fourth embodiment, the motors 70 and 71 are controlled in order to suppress the elastic behavior of the original conveying apparatus by setting the inclination angular velocity $\omega_3$ of the original conveying apparatus in the control computation. That is, the control computation portion 14b changes the rotation angular velocity $\omega_1$ of the motor 70 according to the variation in inclination angular velocity $\omega_3$ of the original conveying apparatus 100, and the motor 71 is caused to follow the drive of the motor 70 to respond to the variation in inclination angular velocity $\omega_3$ of the original conveying apparatus 100.

Using the above-described control system illustrated in FIGS. 10A and 10B, the image reading apparatus obtains the same effects as the third embodiment. Additionally, in the image reading apparatus, the angular velocities of the motors 70 and 71 are matched with each other such that variation in rotation angular velocity between the motors 70 and 71 is reduced, so that the inclination and deformation of the original conveying apparatus can rapidly be corrected.

Although the two motor are used in the third embodiment, at least three motors may be used. In such cases, it is necessary that the rotation angular velocities of at least the three motors be matched with one another. In the case where the cylinders are used instead of the motors, the movements (actuation state) of the cylinders are detected to determine actuation speeds, and the actuation speeds of the plural cylinders are matched with one another.

The image forming apparatus 1 includes the image reading apparatus in which the position of the original is not substantially shifted when the original conveying apparatus presses the original against the original base plate. Therefore, the number of cases where the image is re-formed on the new sheet can be decreased to improve the image forming efficiency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-157954, filed Jun. 14, 2007, which is hereby incorporated by reference herein in its entirety.

What is claimed is:

1. An image reading apparatus comprising:
   an original base plate;
   an original pressing portion configured to rotate around a rotational axis arranged horizontally with respect to the original base plate, and further configured to press an original against the original base plate while the original base plate is closed;
   an image reading portion configured to read an image of the original while the original is pressed against the original base plate by the original pressing portion;
   a first driving portion configured to rotate the original pressing portion around the rotational axis;
   a second driving portion configured to rotate the original pressing portion around the rotational axis;
   an inclination detection portion configured to detect an inclination of the original pressing portion around a line which passes through a barycenter of the original pressing portion and which is vertical with respect to the rotational axis; and
   a controlling portion configured to control the first and second driving portions to correct an inclination of the original pressing portion based on a detected inclination of the original pressing portion detected by the inclination detection portion as the first driving portion and the second driving portion rotate the original pressing portion between a closure position where the original pressing portion covers the original base plate and an open position where the original base plate is exposed.

2. The image reading apparatus according to claim 1, further comprising:
   a plurality of actuation state detection portions which respectively detect actuation states of the first and second driving portions,
   wherein the controlling portion is further configured to match actuation speeds of the first and second driving portions to each other based on the actuation states detected by the actuation state detection portions.

3. The image reading apparatus according to claim 2,
   wherein the plurality of actuation state detection portions include:

(i) a first rotary encoder, provided on the first driving portion, which detects a rotation angle of the first driving portion, and (ii) a second rotary encoder, provided on the second driving portion, which detects a rotation angle of the second driving portion, and wherein the controlling portion is further configured to match the actuation speeds of the first and second driving portions with each other based on signals from the first and the second rotary encoders.

4. The image reading apparatus according to claim 1, wherein the controlling portion is further configured to control the first and second driving portions to correct the inclination of the original pressing portion, when the inclination angle of the original pressing portion, detected by the inclination detection portion, becomes a predetermined inclination angle or more.

5. The image reading apparatus according to claim 1, wherein the inclination detection portion detects the inclination of the original pressing portion with respect to an axis that is vertical to the rotational axis of the original pressing portion.

6. The image reading apparatus according to claim 1, further comprising:

a storage portion in which an opening and closing speed to an elapsed time after the start of an opening and closing action of the original pressing portion is stored, wherein the controlling portion controls an actuation speed of the first driving portion such that the original pressing portion can be opened and closed according to the opening and closing speed, and the controlling portion controls an actuation speed of the second driving portion such that the actuation speed of the second driving portion is matched with the actuation speed of the first driving portion.

7. The image reading apparatus according to claim 1, further comprising:

a storage portion in which an opening and closing speed to an elapsed time after the start of an opening and closing action of the original pressing portion is stored, wherein the controlling portion controls the actuation speeds of the first and second driving portions such that the original pressing portion can be opened and closed according to the opening and closing speed.

8. An image forming apparatus comprising:

an image reading apparatus which reads an image of an original; and an image forming portion which forms the image on a sheet based on image information read by the image reading apparatus, wherein the image reading apparatus is the image reading apparatus according to claim 1.

9. The image reading apparatus according to claim 1, wherein the barycenter of the original pressing portion is at a position different from a center of the original pressing portion in the direction parallel to the rotational axis.

10. The image reading apparatus according to claim 1, wherein the inclination detection portion is disposed at the barycenter of the original pressing portion in a direction parallel to the rotational axis.

* * * * *